United States Patent [15] 3,646,532

Winter [45] Feb. 29, 1972

[54] DEVICE FOR THE PROCESSING OF ACCOUNT CARDS, MAGNETIC ACCOUNT CARDS OR THE LIKE IN AUTOMATIC ACCOUNTING MACHINES, ELECTRIC TYPEWRITERS AND SIMILAR APPARATUS

[72] Inventor: Udo Winter, Paderborn, Germany

[73] Assignee: Nixdorf Computer AG, Paderborn, Germany

[22] Filed: Apr. 24, 1970

[21] Appl. No.: 31,570

[30] Foreign Application Priority Data

Apr. 28, 1969 Germany ......................P 19 21 577.1

[52] U.S. Cl. ............................340/174.1 R, 271/52, 271/64

[51] Int. Cl. ........................................B65h 5/06, G11b 5/00

[58] Field of Search ................................271/51, 52, 53, 64; 340/174.1 R

[56] References Cited

UNITED STATES PATENTS

| | | | |
|---|---|---|---|
| 2,377,525 | 6/1945 | Schutt | 271/51 |
| 3,083,012 | 3/1963 | Poland | 271/64 |
| 3,329,424 | 7/1967 | Rabek | 271/64 |

*Primary Examiner*—Joseph Wegbreit
*Attorney*—Markva & Smith

[57] ABSTRACT

A device for the processing of account cards, magnetic account cards or the like in accounting machines, electric typewriters and similar apparatus comprises a gridlike drum for the admission and extraction of a card to and from a circular guide track and for guiding it therein. The guide track for the card is delimited internally by a number of spaced rigid guide rings mounted on a drum main shaft and externally by deflectors distributed over the periphery of the drum and pivoted one on either side of each guide ring to longitudinal bars so that always two neighboring deflectors are angularly displaced. The longitudinal bars are distributed over the periphery of the drum and one end face of the drum consists of a rigid plate, driving rollers and counterpressure rollers being provided in the vicinity of said rigid plate, in the zone of said guide track.

12 Claims, 2 Drawing Figures

UDO WINTER

Lowry, Rinehart, Markva & Smith

DEVICE FOR THE PROCESSING OF ACCOUNT CARDS, MAGNETIC ACCOUNT CARDS OR THE LIKE IN AUTOMATIC ACCOUNTING MACHINES ELECTRIC TYPEWRITERS AND SIMILAR APPARATUS

BACKGROUND OF THE INVENTION

This invention relates to a device for the processing of account cards, magnetic account cards or the like in automatic accounting machines, electric typewriters and similar apparatus.

In the sphere of data processing, magnetic account cards have come to be used as data carriers. Such a magnetic account card consists of a cardboard material weighing about 160 g./m.$^2$ and is fitted along one of its edges with a magnetic tape or provided with an application of magnetic ink. By means of a read-write head and an erasing head any desired data content can be stored on or erased from the magnetic tape or ink.

The problems arising in the process of providing text by magnetic means on the magnetic tape or ink and of reading the contents therefrom arise from the fact that the position of the read-write head in relation to the magnetic tape or ink must always be the same and thus reproducible. Lateral displacement or tilting of the account card and thus of the magnetic tape or ink will inevitably result in incorrect recording.

In all devices known in the art the magnetic account card is guided by means of a sprocket wheel or a friction-wheel transport system in such a way that in the former case the sprocket wheel engages a system of perforations provided along two edges of the account card. The account card is additionally guided by metal plates installed in card holders. Such an account card guiding system is subject to the drawback that when account cards of different widths are being processed the card holders and the sprocket wheels have to be displaced laterally in accordance with the size of the account card.

The structure of a friction-wheel transport system is similar to that of the sprocket-wheel system, except that the sprocket wheels are replaced by so-called friction wheels so that the lateral perforations in the card can be dispensed with. The aforementioned drawback, however, applies to the friction-wheel transport system likewise.

A further disadvantage of the known devices resides in the fact that the account card can only be transported forwards and backwards. If the card is to be magnetically processed in one direction only, e.g., from the top to the bottom, i.e., in the order "read, erase and mark the magnetic tape," the account card has to be moved by a blank step, either in the forward or in the reverse transport operation, resulting in time losses. Furthermore, the driving motor has to perform a start-stop and also a reversing operation. In this connection it has already been proposed that in order to avoid blank steps the account card should be clamped onto a rotating drum. It has been found, however, that the account cards are then very difficult to guide.

SUMMARY OF THE INVENTION

In order to avoid the aforementioned drawbacks it is the object of the invention to provide an apparatus enabling these disadvantages in connection with the guiding of magnetic account cards to be avoided.

To attain this object the present invention provides a device for the processing of account cards, magnetic account cards or the like in accounting machines, electric typewriters and similar apparatus, which comprises gridlike drum having two rigid end plates, a main shaft and a number of longitudinal bars distributed over the periphery of the drum; a plurality of spaced rigid guide rings mounted on said shaft; a plurality of deflectors distributed over the periphery of said drum and pivoted one on either side of each guide ring to the longitudinal bars so that always two neighboring deflectors are angularly displaced; and a plurality of driving rollers and a corresponding number of counterpressure rollers arranged in the vicinity of one of said rigid plates cooperatively to transport and guide a card along a guide track defined internally by the rigid guide rings and externally by the pivotable deflectors, said pivotable deflectors being arranged to provide for the admission of a card to, and the extraction of said card from, said guide track.

Magnets or similar means may be provided to enable the deflectors to be pivoted as required.

The driving rollers may be arranged nearer to, or farther away from the main shaft than the counterpressure rollers. In a preferred embodiment, the shafts of the driving rollers extend horizontally and the shafts of the counterpressure rollers at an angle of about 10° in respect of the shafts of said driving rollers which are driven in one direction of rotation by an electric motor.

The counterpressure rollers are preferably made of metal, whereas it is advantageous to make the driving rollers of an abrasion-resisting material, such as rubber, plastics or the like.

Within the gridlike drum, in the zone of the circular or similarly continuous guide track, a read-write head and an erasing head may be arranged between two neighboring counterpressure rollers or between two neighboring driving rollers.

BRIEF DESCRIPTION OF THE DRAWING

The invention will now be described by way of example and with reference to the accompanying drawing, in which.

DESCRIPTION OF THE PREFERRED EMBODIMENTS

Figure 1:
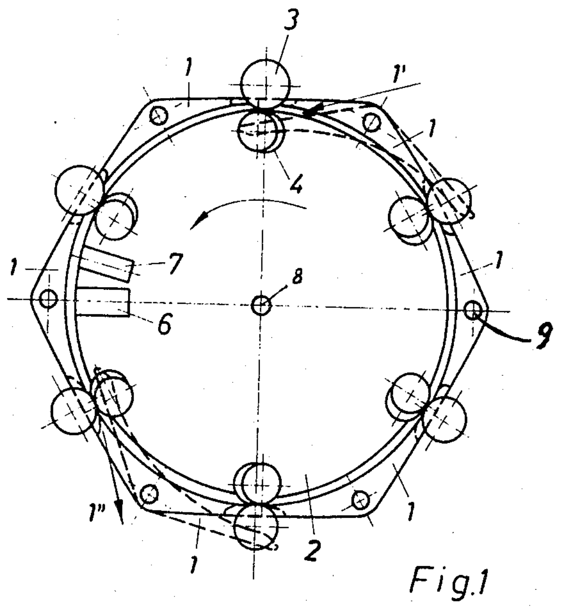
FIG. 1 is a side view of a device according to the invention.
Figure 2:
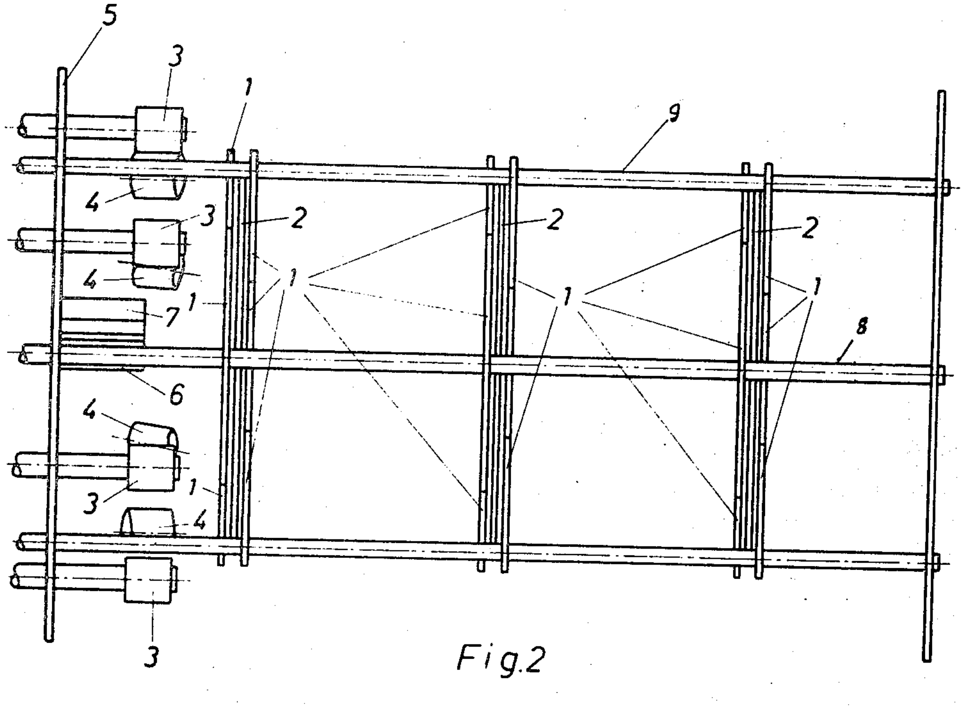
FIG. 2 is a top plan view thereof.

The drawing shows a device for the processing of account cards, magnetic account cards or the like in automatic accounting machines, electric typewriters and similar apparatus, which comprises a gridlike drum having two rigid end plates 5, a main shaft 8 and a number of longitudinal bars 9 distributed over the periphery of the gridlike drum. A plurality of spaced rigid guide rings 2 are mounted on the shaft 8.

A plurality of two-armed deflectors 1 are distributed over the periphery of the gridlike drum and so pivoted one on either side of each guide ring 2 to the longitudinal bars 9 that always two neighboring deflectors are angularly displaced.

A plurality of driving rollers 3 and a corresponding number of resiliently mounted counterpressure rollers 4 are arranged in the vicinity of one of the rigid end plates 5 and cooperatively transport and guide a magnetic account card along a circular or similarly closed guide track which is defined internally by the rigid guide rings 2 and externally by the pivotable deflectors 1. When a deflector 1 is pivoted with the aid of a magnet or similar device the magnetic account card can be admitted to the circular path or extracted therefrom. The position of the deflector 1 for the admission and extraction of the card is shown in FIG. 1 at 1' and 1'' respectively by broken lines. Several pivotable deflectors 1 are arranged side by side in spaced relationship and form one of a plurality of deflecting systems. As the entire external guiding system for the magnetic account cards consists of the deflectors 1, the magnetic account cards, after being magnetically processed, can be caused to leave the guide track at preselected places. The account card can pass round the device either once or a number of times. After leaving its guide track it can easily be sorted and conveyed into receiver compartments.

A fresh account card is caused to enter the guide track as soon as the foot of a preceding card has passed through a light barrier and the latter transmits a signal to the program.

After being drawn into the guide track the magnetic account card is transported and guided by means of the driving rollers 3 and the counterpressure rollers 4 are situated at an angle of about 10° in respect of the horizontally extending shafts of the driving rollers 3, thus exerting a lateral guiding force on the account card in such a way that the card, regardless of its width, is always guided along the rigid side plate 5 in the vicinity of which the driving rollers 3 and the counterpressure rollers are arranged.

In the embodiment shown and described, the driving rollers 3 are arranged farther away from the main shaft 8 of the gridlike drum than the counterpressure rollers 4. It is, however, self-evident that an arrangement is possible in which the counterpressure rollers 4 are located farther away from the main shaft 8 than the driving rollers 3. Between two neighboring counterpressure rollers 4 or driving rollers 3 a read-write head 6 and an erasing head 7 are provided within the gridlike drum, in the zone of the guide track.

Owing to the fact that the read-write head 6 and the erasing head 7 are situated in the "inner circle" it follows that the account card comes to rest against the heads 6 and 7 with a natural looping angle, so that a high-amplitude ratio in the reading and writing operations is ensured.

The advantage offered by the invention, by comparison with apparatus already known, resides in the fact that as the account cards are guided along a circular track having an appropriate diameter the time losses mentioned at the beginning are obviated. A further advantage resides in the fact that only one direction of rotation for the continuously rotating driving motor is required for the sequence of operations to be performed.

The fact that account cards of different widths can be processed in succession without any adjustment of the card holders being necessary is likewise to be regarded as an advantage. By comparison with the magnetic account card processing units hitherto employed an additional advantage is to be seen in the fact that the card is transported over the read-write head and the erasing head very accurately without any lateral displacement or tilting. The information recorded on the magnetic tape or read therefrom is thus of particularly good quality. The invention enables greater information density to be obtained than is the case with the known data-processing equipment.

As one final advantage, mention should be made of the fact that as conventional drums enclosed on all sides are dispensed with, no excessive weight has to be moved. Neither does the invention involve the use of clamping devices for holding the account cards.

The invention may be embodied in other specific forms without departing from the spirit or essential characteristics thereof. The present embodiments are therefore to be considered in all respects as illustrative and not restrictive.

What is claimed is:

1. A device for the processing of account cards, magnetic account cards or the like in accounting machines, electric typewriters and similar apparatus, comprising a. a gridlike drum having two rigid end plates, a main shaft and a number of longitudinal bars distributed over the periphery of the drum;

b. a plurality of spaced rigid guide rings mounted on said shaft;

c. a plurality of deflectors distributed over the periphery of said drum and pivoted one on either side of each guide ring to the longitudinal bars so that always two neighboring deflectors are angularly displaced; and d. a plurality of driving rollers and a corresponding number of counterpressure rollers arranged in the vicinity of one of said rigid plates cooperatively to transport and guide a card along a guide track defined internally by the rigid guide rings and externally by the pivotable deflectors, said pivotable deflectors being arranged to provide for the admission of a card to, and extraction of said card from, said guide track.

2. A device in accordance with claim 1, wherein the driving rollers are arranged nearer to the main shaft than the counterpressure rollers.

3. A device in accordance with claim 1, wherein the counterpressure rollers are arranged nearer to the main shaft than the driving rollers.

4. A device in accordance with claim 1, wherein the driving rollers have horizontally extending shafts and the shafts of the counterpressure rollers are arranged to extend at an angle of about 10° in respect of the shafts of said driving rollers.

5. A device in accordance with claim 1, wherein the driving rollers are made of a material selected from the group consisting of rubber and plastics and are arranged to be driven in one direction of rotation only.

6. A device in accordance with claim 1, wherein the counterpressure rollers are resiliently mounted and made of metal.

7. A device in accordance with claim 1, wherein a read-write head and an erasing head are arranged between two neighboring counterpressure rollers within the gridlike drum, in the zone of the guide track.

8. A device in accordance with claim 1, wherein a read-write head and an erasing head are arranged between two neighboring driving rollers within the gridlike drum, in the zone of the guide track.

9. A device for feeding account cards, magnetic account cards or the like in accounting machines, electric typewriter and similar apparatus, comprising a. annular means, b. cylindrical means located within said annular means and comprising a shaft and a plurality of rings mounted on said shaft, c. the external cylindrical surface of said cylindrical means being spaced from the internal cylindrical surface of said annular means to define a cylindrical path for said cards therebetween, d. said annular means comprising a pair of support elements mounted at spaced locations on said shaft on opposite sides of said plurality of rings, a plurality of bars mounted between said support elements and surrounding said plurality of rings, and pivoted deflector means for admitting and extracting said cards to and from said cylindrical path, said deflector means comprising a plurality of deflector elements pivotally mounted on at least one of said bars, and e. means for driving said cards about said cylindrical path.

10. A device in accordance with claim 9 further comprising guide means on at least one end of said cylindrical path for guiding said cards about said cylindrical path.

11. A device in accordance with claim 9 wherein said drive means comprises a plurality of driving rollers and an equal number of counterpressure rollers, each driving roller being paired with a counterpressure roller and said pairs of rollers being arranged about said cylindrical path for driving said cards therebetween.

12. A device in accordance with claim 9 further comprising read-write and erasing heads arranged along said cylindrical path for reading, recording and erasing information on said cards driven about said cylindrical path.

* * * * *